US011251457B2

(12) United States Patent
Suttil et al.

(10) Patent No.: US 11,251,457 B2
(45) Date of Patent: *Feb. 15, 2022

(54) IMMISCIBLE LIQUID SEPARATED BATTERY SYSTEM

(71) Applicant: PHILLIPS 66 COMPANY, Houston, TX (US)

(72) Inventors: James Anthony Suttil, Bartlesville, OK (US); Hongjin Tan, Bartlesville, OK (US); Neal McDaniel, Ochelata, OK (US); Sharmila Samaroo, Bartlesville, OK (US); Jeffrey H. Drese, Owasso, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,124

(22) Filed: Sep. 20, 2019

(65) Prior Publication Data

US 2020/0099081 A1  Mar. 26, 2020

Related U.S. Application Data

(60) Provisional application No. 62/734,317, filed on Sep. 21, 2018, provisional application No. 62/734,327, filed on Sep. 21, 2018.

(51) Int. Cl.
*H01M 8/18* (2006.01)
*H01M 6/14* (2006.01)
(Continued)

(52) U.S. Cl.
CPC ............. *H01M 8/188* (2013.01); *H01M 6/14* (2013.01); *H01M 8/08* (2013.01); *H01M 8/20* (2013.01); *H02J 7/00* (2013.01)

(58) Field of Classification Search
CPC .......... H01M 8/188; H01M 6/14; H01M 8/20; H01M 8/08; H01M 8/18; H02J 7/00; Y02E 60/50
See application file for complete search history.

(56) References Cited

U.S. PATENT DOCUMENTS

2019/0296383 A1* 9/2019 Cushman .............. H01M 4/905

OTHER PUBLICATIONS

Musbaudeen O. Bamgbopa, Saif Almheiri, Hong Sun, "Prospects of recently Developed Membraneless Cell Designs for Redox Flow Batteries", Renewable and Sustainable Energy Reviews 70, 2017, pp. 506-518.

(Continued)

*Primary Examiner* — Muhammad S Siddiquee
(74) *Attorney, Agent, or Firm* — Phillips 66 Company

(57) ABSTRACT

A redox flow battery is described that does not include an ion exchange resin such as a proton exchange membrane but rather uses a generally stationary separator liquid that separates the anolyte from the catholyte at immiscible liquid-liquid interfaces. Solvents and electrochemically active components of the anolyte and catholyte would not cross the liquid-liquid interfaces between the separator liquid and the anolyte and catholyte, but certain ions in each of the anolyte and catholyte would cross the interface during charging and discharging of the redox flow battery. The separator liquid comprises a relatively small total volume of liquid in such a flow battery arrangement as compared to the anolyte and catholyte. Suitable chemical options are described along with system options for utilizing immiscible phases.

8 Claims, 14 Drawing Sheets

(51) Int. Cl.
  *H01M 8/20* (2006.01)
  *H02J 7/00* (2006.01)
  *H01M 8/08* (2016.01)

(56) References Cited

OTHER PUBLICATIONS

Musbaudeen O. Bamgbopa, Yang Shao-Horn, Raed Hashaikeh, Saif Almheiri, "Cyclable Membraneless Redox Flow Batteries Based on Immiscible Liquid Electrolytes: Demonstration With All-Iron Redox Chemistry", Electrochimica Acta 267, 2018, pp. 41-50.
Paula Navalpotro, Jesus Palma, Marc Anderson, and Rebeca Marcilla, "A Membrane-Free Redox Flow Battery with Two Immiscible Redox Electrolytes", Angewandte Chemie, Wiley Online Library, 2017, 129, pp. 12634-12639.

* cited by examiner

IMMISCIBLE LIQUID SEPARATED BATTERY SYSTEM

CROSS-REFERENCE TO RELATED APPLICATIONS

This application is a non-provisional application which claims benefit under 35 USC § 119(e) to U.S. Provisional Application Ser. No. 62/734,317 filed Sep. 21, 2018, entitled "IMMISCIBLE LIQUID SEPARATED BATTERY SYSTEM," and to U.S. Provisional Application Ser. No. 62/734,327 filed Sep. 21, 2018, entitled "MULTIPHASIC BATTERY SYSTEM," both of which are incorporated herein in their entirety.

STATEMENT REGARDING FEDERALLY SPONSORED RESEARCH OR DEVELOPMENT

None.

FIELD OF THE INVENTION

This invention relates to flow battery systems or liquid electrolyte battery systems.

BACKGROUND OF THE INVENTION

Flow batteries store electrical energy in a chemical form using liquid electrolytes and dispense the stored energy in an electrical form via a spontaneous reverse redox reaction of the electrolytes. A flow battery is an electrochemical storage device in which an electrolyte containing one or more dissolved electro-active species flows through a reactor cell where chemical energy is converted to electrical energy. The flow battery may be recharged by reversing the electron flow and restoring the potential electrical energy which is converted to chemical energy.

The electrolytes used in flow batteries are generally composed of ionized metal salts that are stored in large external tanks and are pumped through each side of the cell according to the charge/discharge current applied. Externally stored electrolytes are directed through the battery system by pumping, gravity feed, or by any other method of moving fluid through the system. One advantage of flow batteries is that they can be almost instantly recharged by replacing the electrolyte liquid, while simultaneously recovering the spent material for re-energization. Another is that the capacity of the flow battery for energy storage is independent of that for power production, allowing flow batteries to be sized in accordance with their intended energy storage application. An analogy is a motor vehicle where the engine is sized to move the load expected to be carried and the fuel tank is sized to carry that load for a distance that can also be selected. For a flow battery, the capacity is easily modified by varying the tank size. The power is controlled by the number and size of the power cells. For a solid-state battery, instantaneous power and capacity are strongly linked. Different classes of flow batteries have been developed, including redox and hybrid. The fundamental difference between conventional batteries and flow cells is that energy is stored as the electrode material in conventional batteries but as the electrolyte in flow cells.

Since the electrolyte is stored external to the power cell, the amount of energy that can be stored by a flow battery is largely determined by the solubility of the electrolytes within their solvent system, and the size of the tanks. The size of the tanks and storage capacity can be easily scaled. In one example to increase the storage capacity, the tank sizes can be doubled using ready-made storage tanks at an estimated cost increase of only 50 percent compared to a new system. However, one problem with flow batteries is that the highly specialized ion-selective membrane materials, which separate the two half-cells, are performance-limiting, short-lived, and expensive.

There exists a need for a reliable and affordable flow battery.

BRIEF SUMMARY OF THE DISCLOSURE

The present embodiment relates to a redox flow battery that includes a catholyte, an anolyte, a separator liquid, a catholyte storage tank for storing catholyte, an anolyte storage tank for storing anolyte and a power cell. The power cell is arranged for catholyte, anolyte and separator liquid to immiscibly coexist therein such that the catholyte and anolyte are not in physical contact with one another but are separated within the power cell by the separator liquid which is in contact with each of the anolyte and catholyte. The liquids separate at immiscible liquid-liquid interfaces and each of the catholyte and anolyte and separator liquid substantially exist within the power cell each in a continuous phase. A catholyte pump is arranged to circulate the catholyte from the catholyte storage tank to the power cell and back to the catholyte storage tank while an anolyte pump is also arranged to circulate anolyte from the anolyte storage tank to the power cell and back to the anolyte storage tank. It should be noted that the separator liquid is basically stationary within the power cell while the anolyte and catholyte flow into and out of the power cell and there is no ion selective resin such as a proton exchange membrane within the redox flow battery separating any of the continuous phases.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
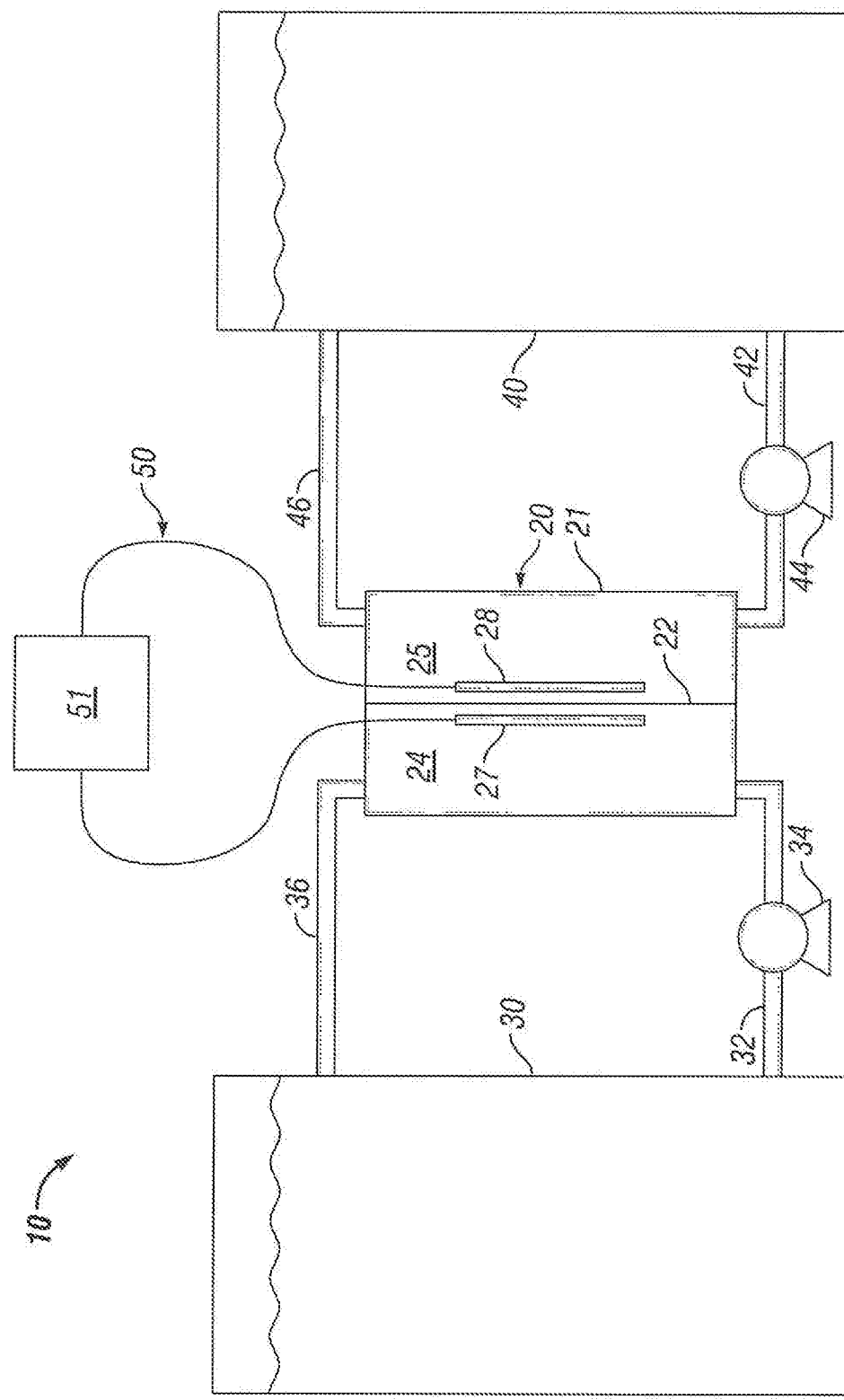
FIG. 1 is a diagram of a basic, prior art flow battery.

Turning to FIG. 1, a conventional redox flow battery is indicated by the arrow 10 with a power cell 20 at the center. The power cell 20 includes a housing 21 with an ion-selective membrane 22 dividing the housing into two compartments 24 and 25. The liquid anolyte is on the left side of the housing 21 in anolyte compartment 24 and the liquid catholyte is on the right side of the housing 21 in catholyte compartment 25. Preferably, each of the compartments 24 and 25 are substantially filled with the respective liquid electrolyte. The anolyte compartment 24 contains liquid anolyte that is continually refreshed from anolyte tank 30 via an anolyte supply conduit 32 and an anolyte circulation pump 34. Anolyte is returned from the housing 21 to the anolyte tank 30 via anolyte return line 36. Similarly, the catholyte side of the housing is supplied with liquid catholyte from catholyte tank 40 via catholyte supply conduit 42 and catholyte circulation pump 44 and the catholyte is returned to tank 40 via catholyte return line 46. Power cell 20 further includes anolyte electrode 27 and catholyte electrode 28 that are each spaced from the ion membrane although in most cases the electrodes are closely spaced from the membrane, but in contact with their respective electrolyte liquids. The electrodes 27 and 28 serve as electrical contacts for the flow battery 10 to be in electrical connection with a circuit 50 that includes an electric load 51.

Figure 2:
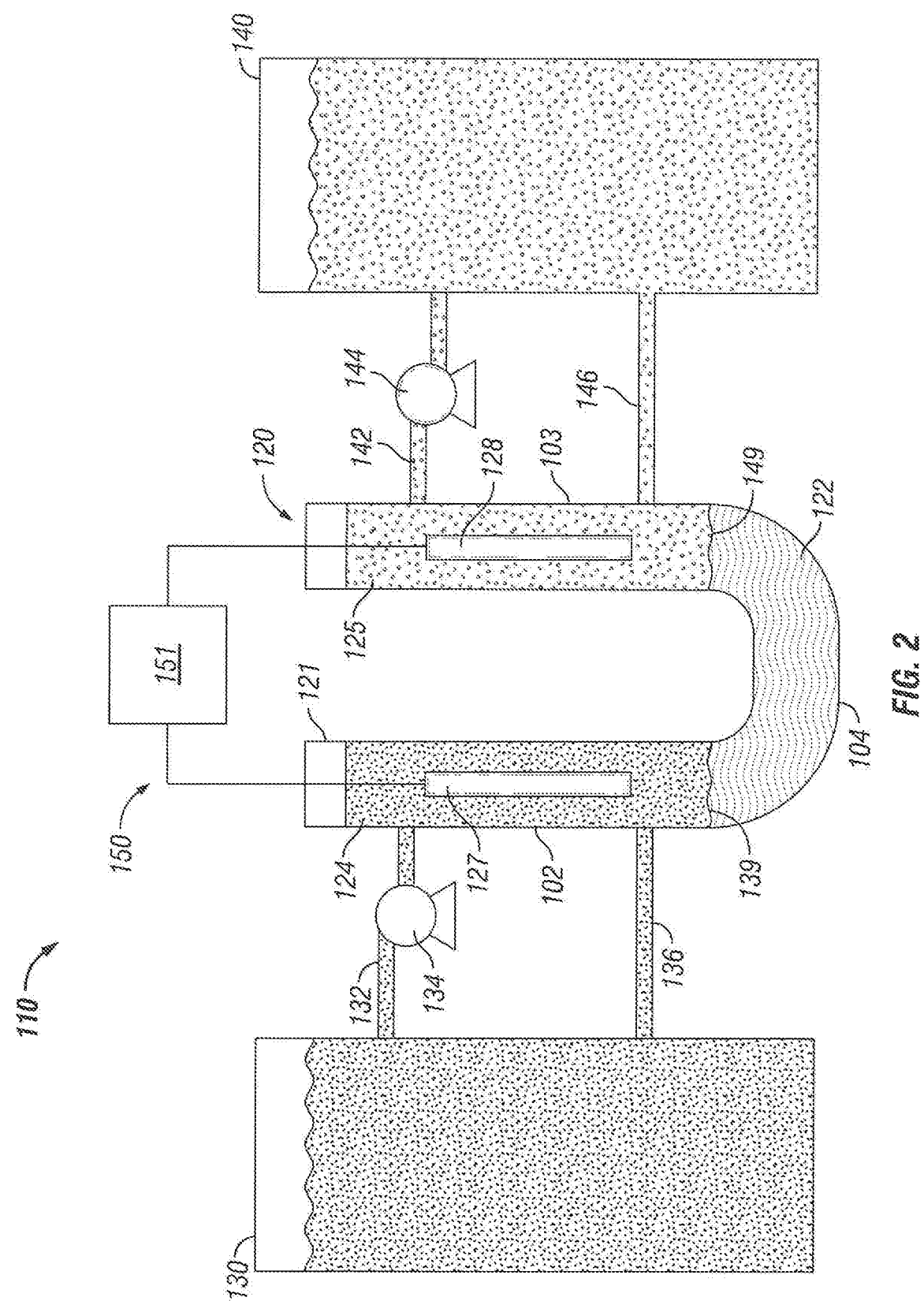
FIG. 2 is a diagram of a first embodiment of the invention for a flow battery.

Turning now to the present invention, current materials used for the membrane 22 tends to be very expensive and not sufficiently robust for providing long term service. As such, the focus of the present invention is to eliminate the membrane by using an immiscible liquid separator positioned to be intermediate of the two half cells. As shown in FIG. 2, the flow battery 110 comprises a power cell 120 that is shown simply as a "U" shaped tubular vessel 121 with two vertical, upwardly extending legs 102 and 103 with a closed bottom 104 connecting the two vertical legs 102 and 103. The tubular vessel has a volume of separator liquid 122 occupying the volume of the vessel 121 in the closed bottom 104 that fully fills the closed bottom 104 and an additional portion extending up in to each of the vertical legs 102 and 103. Within the left vertical leg 102 of the vessel 121 is the anolyte 124 and the anolyte electrode 127. Similarly, within the right vertical leg 103 is the catholyte 125 and the catholyte electrode 128. The separator liquid has to be selected or formulated to accept certain chemicals within the anolyte and catholyte, namely the ionic chemicals that assist with charge balancing and are termed supporting electrolyte, but not accept other, different chemicals, namely the electroactive species and bulk solvents that must remain in the catholyte and anolyte, respectively. As such, the separator liquid may be characterized as semipermeable and ion-conducting although it is at least selective on the ion-conducting ions it accepts and delivers to each of the anolyte and catholyte depending primarily on whether the flow battery is charging or discharging. The separator liquid may also may be characterized as immiscible with both the anolyte and catholyte although the acceptable ions are miscible.

With this arrangement, an interface is formed near the lower portion of each of the vertical legs at the top surface of the ion-conductive separator liquid where the anolyte and catholyte are each generally immiscible with the separator liquid. The first interface is an anolyte separator interface 139 and the second interface is a catholyte separator interface 149. Preferably, in this first arrangement and in most, but not all of the various embodiments, the separator liquid is denser than either of the anolyte and catholyte and more preferably the separator liquid is both denser and chemically immiscible with the bulk of both the anolyte and catholyte. The anolyte and catholyte may each be miscible with one another but are separated by being in opposite legs of the vessel 121. The interfaces 139 and 149 are generally flat and horizontal.

Continuing with the description of FIG. 2, the remainder of the flow battery 110 operates essentially the same as a prior art flow battery shown in FIG. 1 and for ease and simplicity of explanation, similar elements are more simply identified with similar reference numbers where an element in FIG. 1 may be a two digit reference number, the same element in FIG. 2 is identified with a three digit number comprising a "1" in the hundreds position followed by the same two digit reference number of the same element in FIG. 1. This numbering paradigm will continue with each of the various embodiments described in FIGS. 2 through 7.

Figure 3:
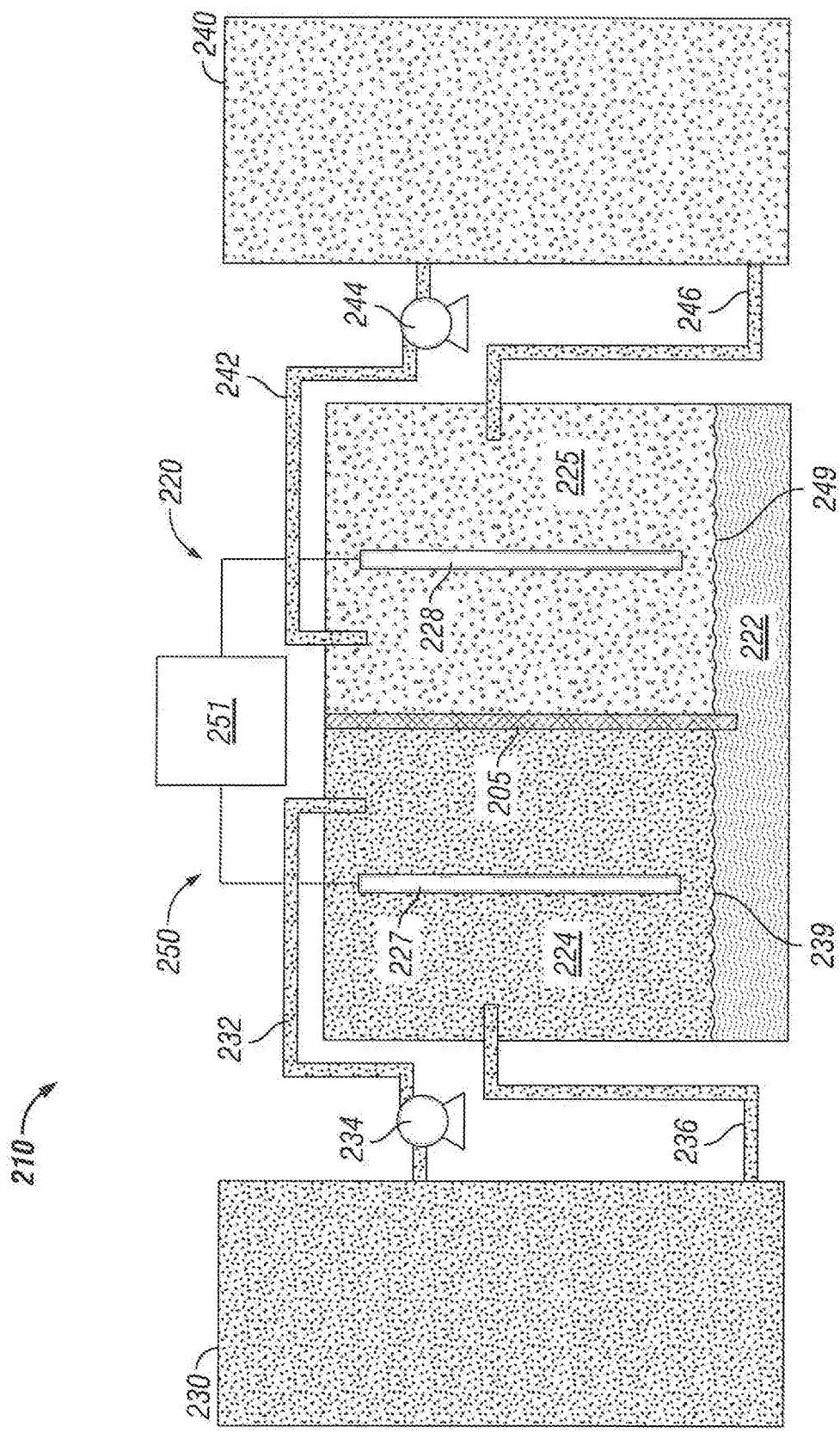
FIG. 3 is a diagram of a second embodiment of the invention for a flow battery.

Turning now to FIG. 3, a flow battery 210 is shown where the power cell 220 includes much larger liquid-liquid interfaces 239 and 249 with the anolyte 224 and catholyte 225, respectively. In this arrangement, a non-conductive and inert physical divider 205 prevents contact between the anolyte and catholyte while dividing the vessel 221 such that two legs 202 and 203 are formed. Note that the level of the ion-conductive liquid is higher than the lower portion of the physical divider 205.

The vessel 221 is, of course, non-electrically conductive and is preferably formed of conventional materials where the liquids are non-corrosive. The volume of the ion-conductive separator liquid is minimal while the anolyte separator interface 239 and catholyte separator interface 249 are broader than as shown in FIG. 2. The electrodes 227 and 228 are flat plates arranged vertically upright so as to divide each of the anolyte half-cell and the catholyte half-cell side into sub-chambers to create a flow path through each side of the power cell 220 so that as the redox reaction progresses, each of the catholyte and anolyte move into proximity with the ion-conductive separator liquid for releasing or gathering ions and then moving the anolyte and catholyte back to the respective storage tank 230 and 240.

It should be noted that the catholyte and anolyte may have different densities than one another. As such, the anolyte separator interface 339 may be vertically higher or lower than the catholyte separator interface 349. The physical separation device 304 and the amount of ion-conductive separator liquid would be arranged to accommodate this difference.

Figure 4:
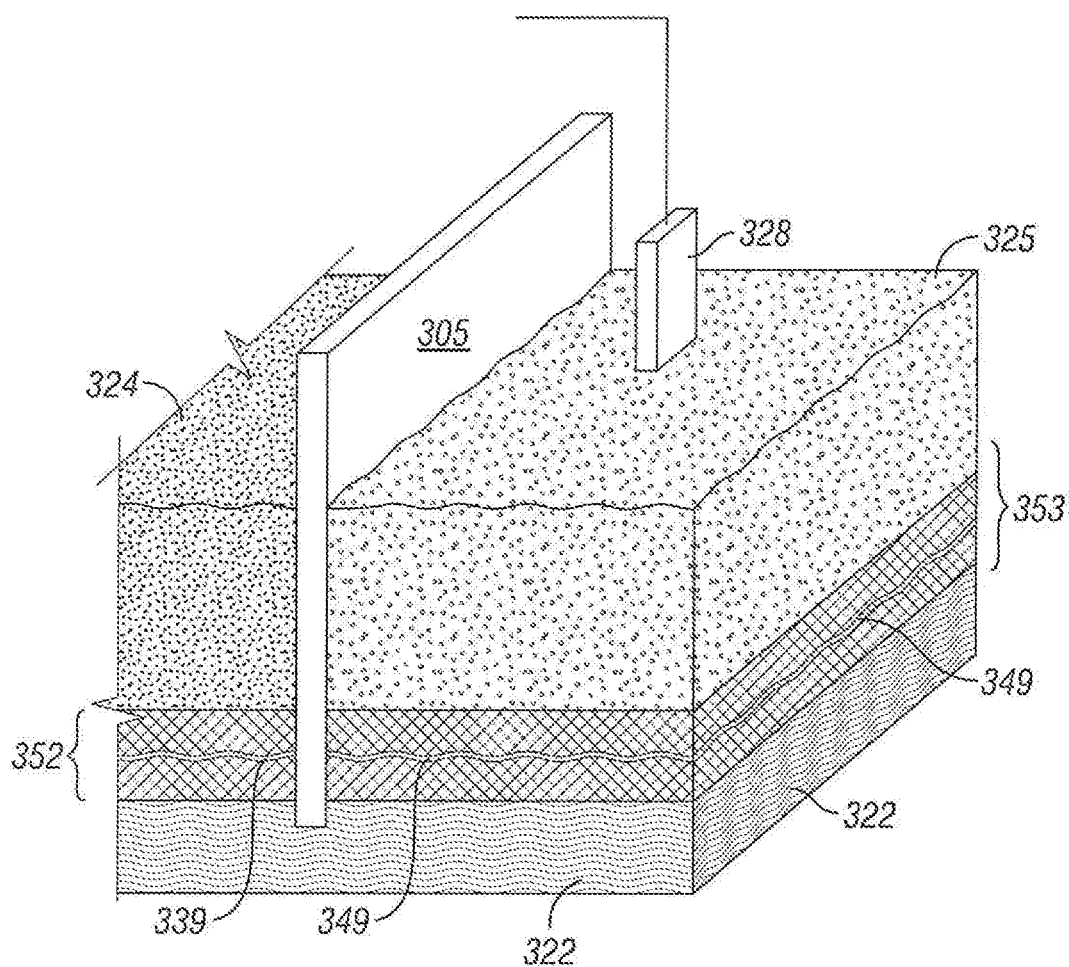
FIG. 4 is an enlarged and fragmentary perspective view of a third embodiment of the invention for a flow battery that is similar to the second embodiment, where the enlarged perspective view highlights the difference between the second and third embodiments.

Turning on to FIG. 4, an alternative arrangement similar to FIG. 3 includes a porous liquid flow buffering device 352 and 353 for each of the liquid-liquid interfaces 339 and 349 to dampen any liquid turbulence or eddy currents that would be likely to upset a stable interface and cause the electrolytes to mix with the separator material.

Ideally, the liquid-liquid interfaces would stabilize within the body of each of the porous liquid flow buffering devices 352 and 353 as shown in the figure. Suitable materials for the porous liquid flow buffering devices 352 and 353 include three dimensional gauzes, wire meshes, expanded open cell foams, polymer meshes and similar open cell systems that principally serve to resist higher velocity liquid flow and dampen liquid eddy currents or other liquid turbulence that may disrupt the integrity of the liquid-liquid interface. The porous liquid flow buffering device is static and non-reactive and have a thickness that may vary from about 0.01 cm up to 0.5 cm from either side of the liquid-liquid interface. The porous liquid flow buffering device may also be formed of a porous solid such that liquid flow through the pores within the solid. As noted above, two distinct porous solids may be used together that are each suited for one electrolyte or the other for a respective thickness of between about 0.01 cm up to a practical limit of maybe 3 inches, but typically from 0.01 cm to and about 0.5 cm on either side of the liquid-liquid interface with a space between the two porous solids of between zero and 0.5 cm. In a preferred embodiment, the liquid-liquid interface is not upset by turbulence by the porous liquid flow buffering devices that interact with about 0.1 cm to about 0.3 cm of the electrolytes on either side of the liquid-liquid interface.

With two flow buffering devices arranged in close proximity to the liquid-liquid interface or where the liquid-liquid interface would be anticipated once the liquids fill the power cell, the liquid separator fills and occupies the pore space of the lower buffering device and then when the anolyte and catholytes are added, those liquids fill and occupy the upper and lower buffering devices on their side of the power cell. The buffering devices may be selected to be phillic to liquid and therefore phobic to the opposite liquid, but it may simply turn out that the buffering device becomes phobic to the opposite liquid simply due to liquid capillary action within the adjacent buffering devices. As such, the respective phillic and phobic natures of the liquids forming the liquid-liquid interface along with the capillary action of the buffering devices creates conditions for a very stable liquid-liquid interface. The thickness of these buffering devices is typically not very thick but may optionally be as thick as 2 to 3 inches, but typically are a few mils up to about 5 to 10 mm thick in practice. It is preferred that the adjacent two buffering devices are in very close proximity maybe even flush together but may also be spaced apart.

Figure 5:
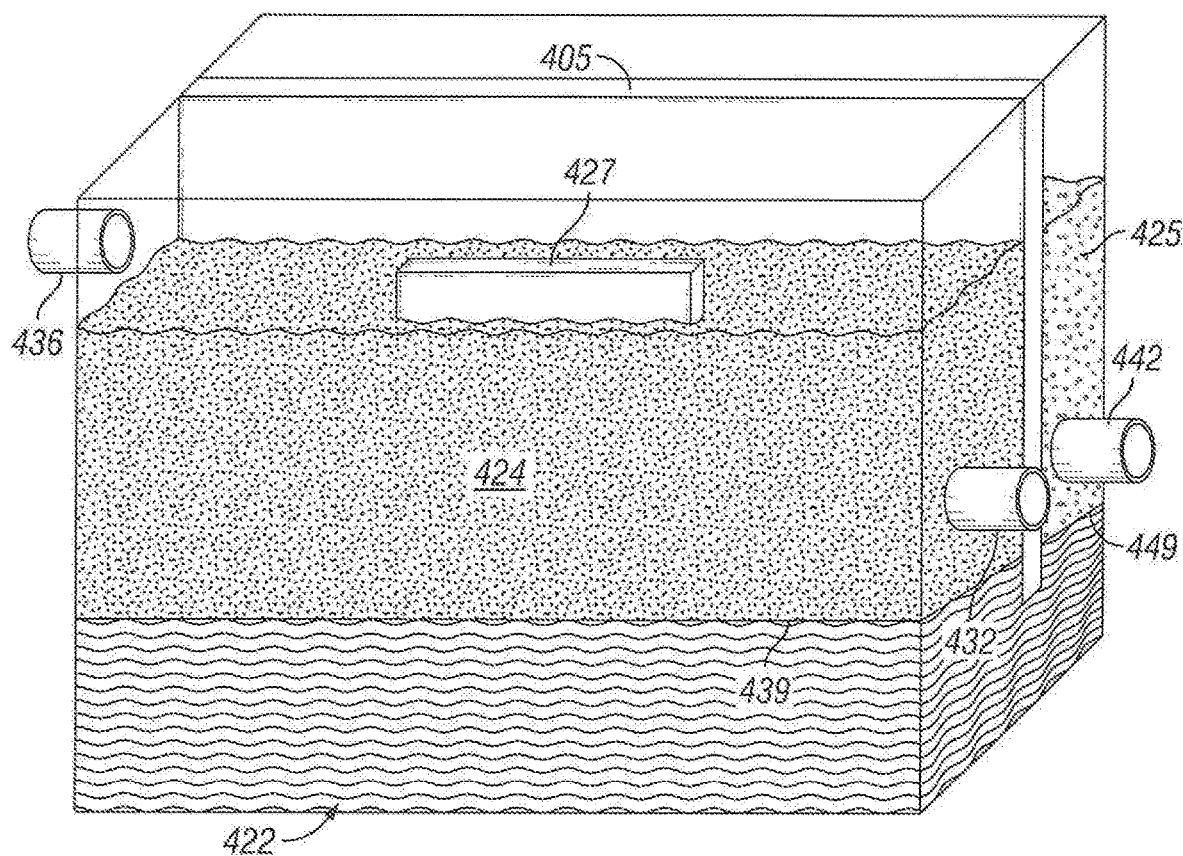
FIG. 5 a perspective view of the power cell portion of the flow battery showing a fourth embodiment of the invention.

Turning to another alternative arrangement showing in FIG. 5 broadens the liquid-liquid interface but keeps the dimension of each of the anolyte and catholyte compartments in the power cell smaller with respect to the opposite compartment. In other words, in reference to FIG. 5, each of the anolyte and catholyte compartments are much longer left to right running along the divider 405, but not front to back across the divider 405. It is anticipated that a long ion path from the anolyte at the front compartment furthest from the divide 405 would be far less active than an ion flow path closest to the divider and therefore the catholyte. In this fourth embodiment, the immiscible surfaces are larger and define a lower average flow path for the ions than the arrangement in FIGS. 3 and 4.

Figure 6:
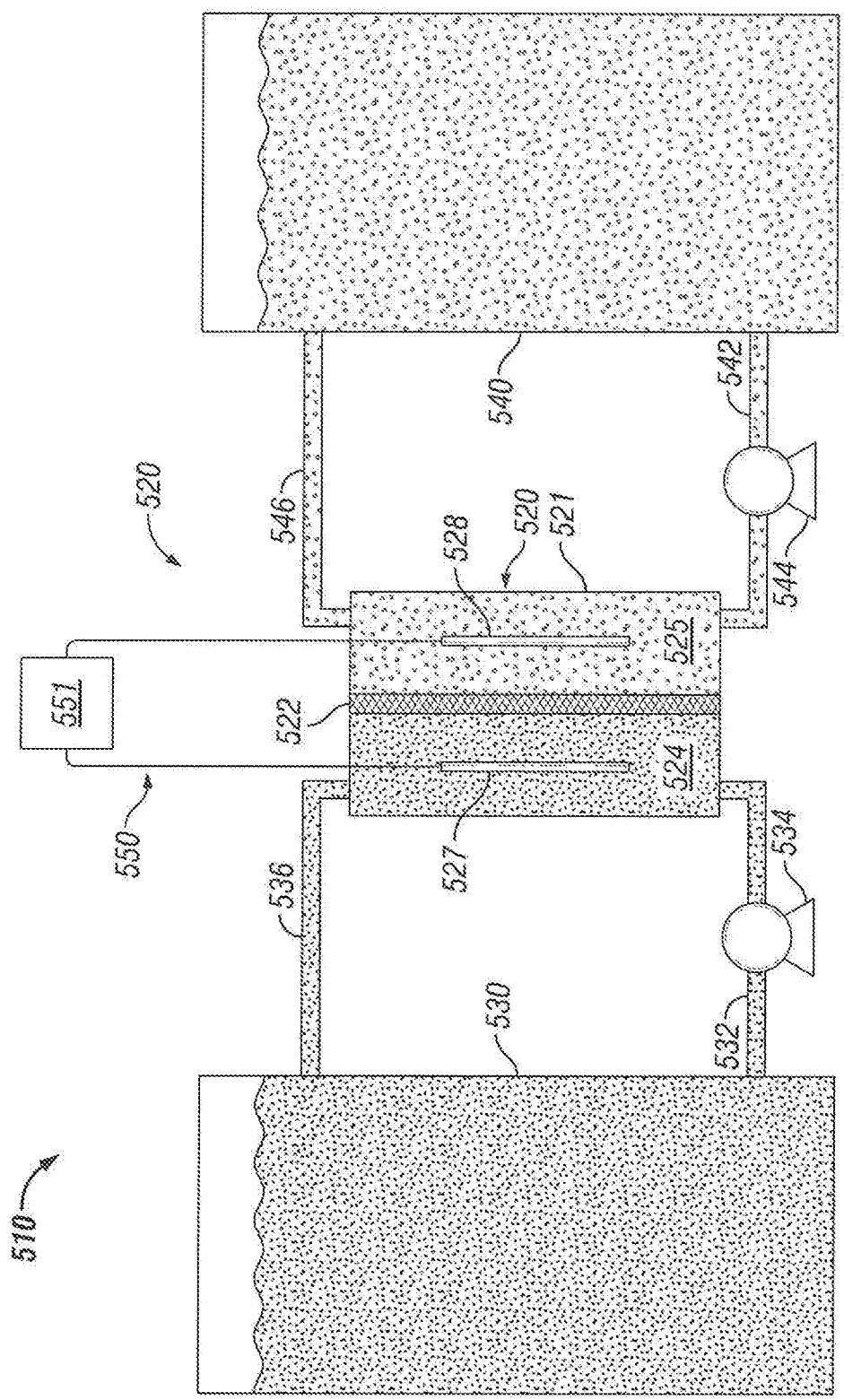
FIG. 6 is diagram of a flow battery showing a fifth embodiment of the present invention.

Turning now to FIG. 6, an embodiment that does not rely on a higher density separator liquid, a sorbent matrix such as a sponge is shown at 522 which holds the separator liquid within the body of the sponge and due to the sorbency of the sponge for the separator liquid and also due to immiscibility and surface tension remains in the vertical orientation. In this arrangement, an even larger liquid interface with a relatively smaller average flow path for supporting electrolyte ions to pass through the separator liquid would be created.

Figure 7:
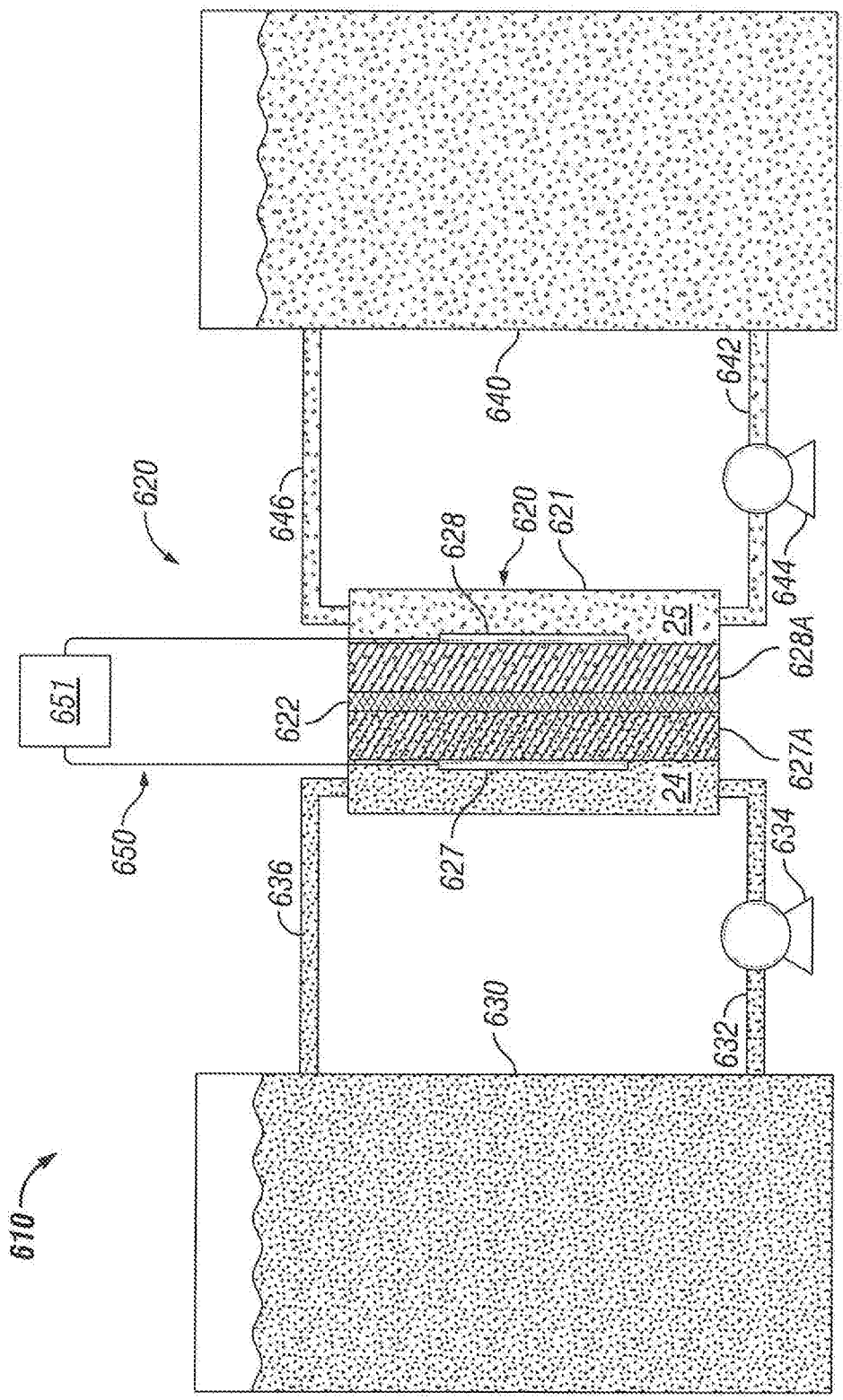
FIG. 7 is a diagram of a flow battery showing a sixth embodiment of the present invention.

FIG. 7 shows a similar embodiment but includes within the anolyte compartment and catholyte compartment a pair of porous graphitic carbon or high surface area graphitic carbon bodies 627a and 628a that better connects electrically the anolyte and catholyte with the electrodes 627 and 628 but also further stabilizes the separator fluid in the sponge 622 with the anolyte and catholyte arranged within a porous or high surface area body that has an affinity for its respective electrolyte. As such, it is believed that this arrangement would better stabilize the separator liquid within the vertical sponge 622.

Turning now to the formulations of the separator liquid and to the electrolytes or more specifically the anolyte and catholyte, the design considerations are substantially interrelated in that all constituent materials are selected to be compatible with all of the other constituents in each of the three liquids. There are few constituents that may be chosen that do not relate to or narrow the range of alternatives that may be selected for other constituents.

Focusing first on the separator liquid, the separator liquid comprises basically two constituents: a bulk liquid and a supporting electrolyte. The supporting electrolyte forms ions within the bulk liquid that freely flow around the bulk liquid and, as explained more later, at least one ion may easily cross both liquid-liquid interfaces into the anolyte and catholyte. The bulk liquid is chosen to be compatible with the supporting electrolyte, but immiscible with the anolyte and catholyte. In some instances, where the supporting electrolyte exists in a liquid state, the supporting electrolyte can act as both the bulk liquid and supporting electrolyte such as for instance, ionic liquids. The total volume of the separator liquid is relatively small compared to the total volume of either of the anolyte and catholyte, and, as such, may comprise more costly constituents than would be practical for the large volume anolyte and catholyte. As such, since water is quite inexpensive, it may be used in the catholyte and anolyte whereby the separator liquid may be formulated with a bulk liquid that is phobic and preferably strongly phobic to water.

Turning now to the each of the anolyte and catholyte, these liquids typically comprise an electrochemically active material, a supporting electrolyte, and a solvent. The electrochemically active material, typically a metal ion, that has at least two stable oxidation states that change during oxidation and reduction reactions from one oxidation state to another. These electrochemically active materials are sometimes referred to as a redox active materials or components and are most commonly in solid form. Simple examples of such electrochemically active materials include, but are not limited to, iron salts, vanadium salts, bromine/hydrobromic acid, chromium salts, and zinc salts.

The solvent is used to dissolve the electrochemically active component to form a stable liquid that may be pumped through the power cell and into the respective tanks. The solvent dissolves the electrochemically active component preferably with a high concentration of electrochemically active material. The solvent also serves to solvate selectively (to the maximum extent possible or practical) the electrochemically active materials in all accessible oxidation states, such that they are contained within the respective half-cell and more specifically within the respective anolyte or catholyte.

Water and water solutions are the preferred diluent as it is cheap, is a liquid at most operating temperatures and provides a good counter fluid to the separator liquid that may be formulated to be strongly immiscible with both the anolyte and catholyte. Although water or aqueous based anolytes and catholytes are preferred, the present invention may be accomplished using anolyte, catholyte and separator liquids of various chemistries to eliminate the need for conventional membrane separators in current flow battery technology. For instance, using a non-aqueous separator liquid such as an organic solvent or ionic liquid may serve well with an aqueous catholyte and anolyte that can include acids or brines. Alternatively, a flow battery according to the present invention may also utilize an aqueous separator liquid and an organic solvent-based anolyte and catholyte. In this arrangement, the anolyte and catholyte would be non-aqueous. In a further different arrangement that is still within the alternatives of the present invention would be an ionic liquid separator liquid where each of the anolyte and catholyte are formulated with organic solvents. In this last case, all three liquids would not be aqueous.

The third component is the supporting electrolyte. This supporting electrolyte would consist of ions which are compatible with the bulk solvent. The supporting electrolyte in the catholyte and anolyte must share a common anion or cation with the supporting electrolyte in the liquid separator that can cross the liquid-liquid interface and maintain charge balance as the electroactive materials undergo oxidation and reduction reactions. Again, these certain ions need to pass through the liquid-liquid interfaces for charge balancing as the electrochemically active materials go through their oxidation and reduction reactions and while the constituent supporting electrolytes that are added to each of the liquids (anolyte, catholyte and separator liquid), it is strongly preferred that the ions that transit through the liquid-liquid interfaces are the same ion. These supporting electrolytes may be described as comprising at least one amphiphilic ion for their ability to move through the liquid-liquid interfaces.

In some arrangements, some or all of the amphiphilic ions may in actuality only pass across one of the liquid-liquid interfaces while others pass across the other liquid-liquid interface. This is to emphasize that the permutations of material selection that are available to a battery designer that would operate in accordance with the present invention.

So, the liquid-liquid interfaces are ideally semipermeable interfaces in that each is permeable to certain specific ions, the amphiphilic ions, while impermeable to the electrochemically active materials and the solvents. The immiscibility primarily comes from the selection of the solvent for the separator liquid and the solvents for the anolyte and catholyte and the choice of electrochemically active material is sometimes dictated by which electrochemically active material is dissolved by the solvents of the catholyte and anolyte.

The anolyte and catholyte may be the same formulated liquids but are typically not the same. Ideally, the electrochemically active materials selected for each of the anolyte and catholyte have substantially separate potential voltage levels for the anolyte relative to the catholyte. Highly separate voltage potentials make for a more energy dense battery. One advantage of a flow battery over solid state batteries is that the electrical capacity that may be stored by a flow battery is partly dictated by the chemistry of the anolyte and catholyte while the power that can be supplied is independent of the chemistry. Solid state batteries with high storage capacity deliver high power, even if high power is not needed by the intended application.

In most of the embodiments, the liquid separator should be denser that either of the anolyte and catholyte. Density may come from the selected bulk liquid of the separator liquid, but densifying additives may be included. For those embodiments where there is no structure at the liquid-liquid interface, a density difference between the separator liquid and either of the anolyte and catholyte should be about 0.1 g/mL greater. For other horizontal liquid-liquid interfaces that have buffering devices, less density differences may be tolerated due to the phillicity or phobicity of the buffering device or devices, but greater density differences will only help. As such, it is anticipated that the maximum foreseeable density difference may be about 1.5 to 2 g/mL.

Techniques to alter the density of the separator liquid to more strongly resist mixing with anolytes and catholytes include high density additives such as salt to form brines and acid addition, for separators that are aqueous. For non-aqueous separators, non-exhaustive additives include soluble salts, ionic liquids, miscible halogenated solvents, and miscible organic carbonates.

The bulk liquid in the separator liquid and the solvents in the anolyte and catholyte can be selected from water, aqueous acids, aqueous brine, ionic liquids, alkyl sulfoxides, alkyl sulfones, cyanoalkanes, nitroalkanes, amides, ethers, ketones, pyrrolidones, alcohols, halogenated alkanes, and alkyl carbonates. More specific examples of the liquids can be selected from dimethylsulfoxide, ethyl methyl sulfone, sulfolane, acetonitrile, nitromethane, nitroethane, dimethylformamide, dimethoxyethane, 3-pentanone, 2-butanone, N-methylpyrrolidone, tert-butyl alcohol, ethylene carbonate, dimethylcarbonate, propylene carbonate, dichloromethane, and 2,2,4,4-tetrachloroethane.

When aqueous brine is used as solvent or bulk liquid in the liquid separator, the aqueous brine would contain water, cations, and anions. Examples of cations can include: $Li^+$, $Na^+$, $K^+$, $Rb^+$, $Mg^{2+}$, $Ca^{2+}$, $Sr^{2+}$, $Ba^{2+}$, $NH_4^+$, $N(CH_3)_4^+$, $N(C_2H_5)_4^+$, $N(C_3H_7)_4^+$, $N(C_4H_9)_4^+$, pyridiniums, imidazoliums, pyrrazoliums, other quaternary ammoniums, and heterocyclic cations. Examples of anions can include: $F^-$, $Cl^-$, $NO_3^-$, $SO_4^{2-}$, $PO_4^{3-}$, $HPO_4^{2-}$, $H_2PO_4^-$, $CO_3^{2-}$, $CN^-$, $BF_4^-$, $PF_6^-$, $B(Ph)_4^-$, $ClO_4^-$, triflimide, methanesulfonate, trifluoromethanesulfonate, p-toluenesulfonate, halogenated alkyl-sulfonates, non-halogenated alkyl-sulfonates, acetate, trifluoroacetate, trichloroacetate, halogenated alkyl-carboxylates, non-halogenated carboxylates, citrate, phenolate, phenolate dertivates, benzenediolate, benzenediolate derivatives, benzenetriolate, benzenetetrolate derivatives, benzenepentolate, benzenepentolate derivatives, benzenehexolate, and benzenehexolate derivatives.

The electrochemically active material for either the anolyte and catholyte can be transition metal salts such electrochemically active materials that include, but are not limited to, iron salts, vanadium salts, chromium salts, and zinc salts. Alternatively, the electrochemically active materials for either the anolyte or the catholyte could be most any transition metal complexes formed from transition metal ions and ligands such as monodentate, bidentate, tridentate, tetradentate, pentadentate, or hexadentate ligands. The binding groups that these ligands comprise can be amines, imines, carboxylates, nitriles, alkoxides, amides, sulfides, phosphines, arsenines, halides, ethers, or dienes. Alternatively, the electrochemically active materials for either the anolyte and catholyte could be selected from any redox active organic molecule with an electrochemical event within the electrochemical window of the solvent. Examples include, but are not limited to, viologens, catechols, quinones, anthraquinones, carbazoles, imides, organosulfur compounds, triphenyl amines, pyridines, pyridiniums, and cyclopropenium materials. While not necessary, it is preferred that the electrochemically active materials are not able to cross either of the liquid-liquid interfaces.

While not preferred, the electrochemically active materials for the anolyte and catholyte may be the same species. In this embodiment, the electrochemically active species are impermeable to the semipermeable separator liquid and have two or more electrochemical events available within the electrochemical windows of both solvents.

It should also be understood that it is preferred for a flow battery of the present invention would have three liquids and two liquid-liquid interfaces. However, it is foreseeable that one could extend this invention to include more than three liquids and, therefore, more than two liquid-liquid interfaces. For example, two immiscible separator liquids may be installed in the power cell and more than one anolyte or catholyte may also be used where a liquid-liquid interface would be arranged within one or both legs of the power cell.

In the embodiment of multiphasic batteries, the separability of the liquid-liquid interfaces is dependent upon the choices of the liquid phases. For example, in one embodiment, the catholyte and anolyte have a density variance greater than 0.1 g/cc relative to the liquid separator. It is theorized that the density variance of the two liquid phases would be sufficient to maintain a planar, semipermeable liquid-liquid interface without causing an emulsion. It is also possible that the density variance be less than 0.1 g/cc, with phase placement maintained instead by a porous physical separator.

Emulsifier can be added to the anolyte, the catholyte, the separator liquid, or two, or all three liquids. The same demulsifier maybe different between each of the liquids or may be the same for both the anolyte and catholyte and separator liquid. Demulsifiers are believed to help maintain the semipermeable liquid-liquid interfaces in all of the embodiments including those in FIGS. 6 and 7. Examples of demulsifiers can include: highly nonpolar solvents such as nonpolar hydrocarbons (paraffins or aromatics), halocarbons (e.g. chlorocarbons such as dichloromethane, chloroform, or carbon tetrachloride), or nonpolar esters (e.g. isopropyl acetate or tert-butyl acetate); short-chained alcohols such as ethanol or isopropanol; hard-ion based salts such as sodium sulfate, sodium carbonate, or potassium chloride; or strongly hydrophobic or hydrophilic, soluble polymers such as polyamines, polyethyleneimines, polyols, or phenolic resins.

Additional requirements of both the anolyte and catholyte can include that they both have a conductivity of at least 100 $\mu$S/cm up to about 500,000 $\mu$S/cm. In yet another embodiment, the electrochemical stability of the anolyte and catholyte and ion-conductive separator liquid overlap of at least 0.1 volt up to about 6 volts with the most practical overlap being between 0.5 to about 2.5 overlap.

In one embodiment the liquids are non-corrosive, allowing the outer casing of the battery to be constructed of any common construction material. Examples of such materials include various plastics, carbon steel, and stainless steel such as 300 series stainless steel. In other embodiments, more corrosion resistant materials can be employed. These corrosion-resistant materials of construction can include halogenated polymers or polymer-coated steels, and high-nickel metallurgies such as nichrome or the 400, 600, or 800 series alloys. Often, these high corrosion-resistance alloys can be employed as surface-deposited layers, protecting less expensive, less resistant alloys such as austenitic steels.

In other embodiments, a barrier polymer can be used to separate the separator liquid with anolyte or catholyte or both. Similarly, different barrier polymer can be used to separate the separator liquid from the other of the anolyte or catholyte. Both of the barrier polymers can be chosen from any range of porous hydrophobic or hydrophilic polymers that are not soluble in any of liquids. In one example, the first barrier polymer can be selected such that it is wetted by the anolyte but not by the separator liquid such that separator liquid does not pass through the first polymer barrier. In another example, the first barrier polymer can be selected such that is wetted by separator liquid but not by anolyte such that the anolyte does not pass through the first polymer barrier. Similarly, the second barrier polymer can be selected such that it is wetted by the catholyte but not by the separator liquid such that the separator liquid does not pass through the second polymer barrier. Alternatively, the second barrier polymer can be selected such that is wetted by the separator liquid but not by the catholyte such that the catholyte does not pass through the second polymer barrier. Hydrophilic polymers may be selected from poly-acrylamides, poly-ethylenimines, poly-acrylic acids, poly-methacrylates, poly-ethylene glycols, poly-ethylene oxides, poly-vinyl alcohols, or poly-vinylpyyrolidones. Hydrophobic polymers may be selected from poly-olefins, poly-amides and imides, poly-carbonates, poly-dienes, poly-esters, poly-ethers, poly-styrenes, poly-vinyl acetals, poly-vinyl chlorides, poly-vinyl esters, poly-vinyl ethers, poly-vinyl ketones, and fluorinated derivatives of the aforementioned materials.

In yet another embodiment, the electrodes can be any known electrode capable of conducting electricity, so long as they are stable within the corresponding anolyte or catholyte. Examples of electrodes include those that contain graphite in various forms, carbon nanotubes, nano-spheres, other structured forms of conductive carbon, as well as conductive polymers. The use of noble-metal coated base metals, such as platinized titanium or gold-plated nickel, is also possible.

When selecting materials for the anolyte and anolyte electrode or catholyte and catholyte electrode it is possible in one embodiment that the heterogeneous CT rate coefficient is at least 0.1 cm/s.

For clarity, one of the primary goals of the present invention was to come up with an alternative redox flow battery that excludes the use of an ion-selective resin whether it be for a cation exchange membrane and anion exchange membrane and especially a proton exchange membrane such as a Nafion® membrane.

The following examples of certain embodiments of the invention are given. Each example is provided by way of explanation of the invention, one of many embodiments of the invention, and the following examples should not be read to limit, or define, the scope of the invention.

Example 1

In Example 1, an energy storage system is demonstrated for a chemical system consisting of two electroactive aqueous liquid phases, each containing an electrode. These phases are separated by non-aqueous liquid separator that is an immiscible ionic liquid comprising 1-butyl-3-methylimidazolium hexafluorophosphate. The anolyte phase is a solution consisting of 5 mM sodium iron(II) bis(2,6-pyridinedicarboxylate) and 0.1 M sodium hexaflurophosphate in water. The catholyte is a solution of potassium ferricyanide and 0.1 M sodium hexafluorophosphate in water.

The immiscible liquid phase was first added to a U-shaped glass container such that it occupied the lower volume. The two liquid phases were then added in equal volumetric parts to the arms of the U-shaped glass container. Carbon electrodes were suspended in each phase, allowing the current to flow through an external circuit.

Figure 8:
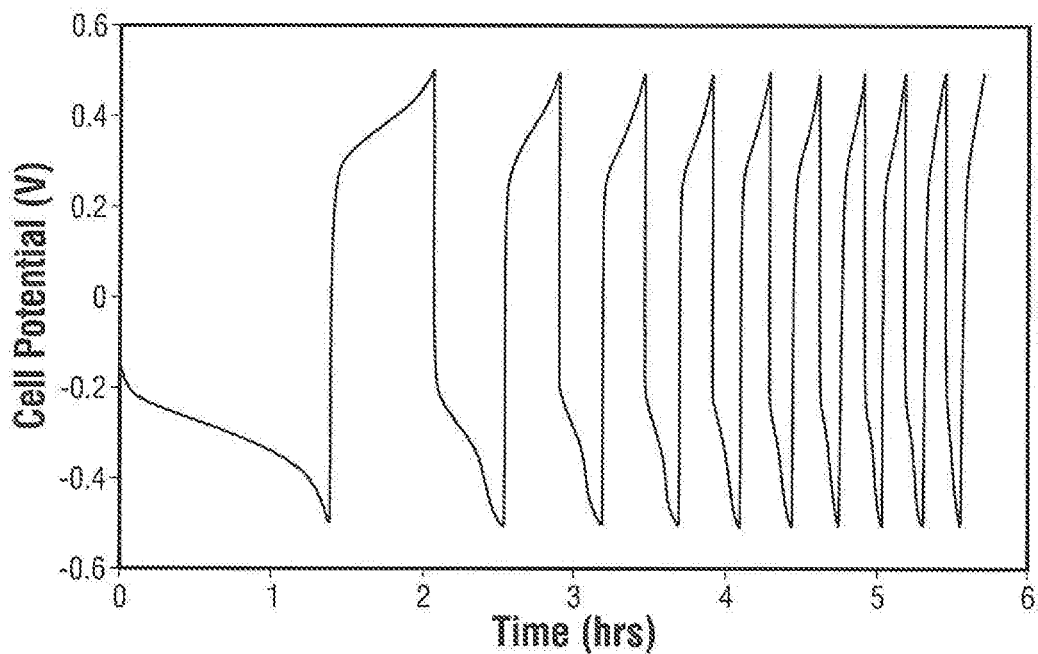
FIG. 8 is a chart illustrating the first 10 cycles for Example 1.
Figure 9:
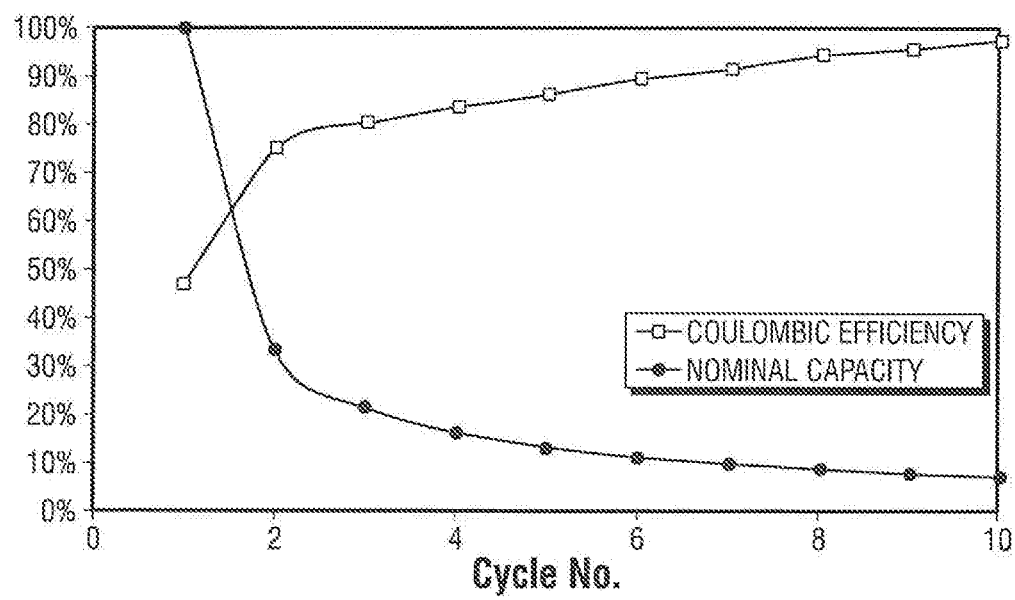
FIG. 9 is a chart illustrating the calculated metrics for Example 1.

Galvanostatic cycles were performed on the assembly, starting with a discharge cycle. The cycles were carried out at ±0.25 mA (see FIG. 8). The estimated coulombic efficiency of the system was around 47% for the first discharge/charge cycle (see FIG. 9).

Example 2

In Example 2, an energy storage system is demonstrated for a chemical system consisting of two electroactive non-aqueous liquid phases, each containing an electrode. These phases are separated by an aqueous immiscible sodium chloride brine. The anolyte phase is a solution consisting of 2.5 mM N,N'-di-n-butyl-4,4'-bipyridinium hexafluorophosphate and 0.1 M tetrabutylammonium chloride in acetonitrile. The catholyte electroactive phase is a solution of ferrocene and 0.1 M tetrabutylammonium chloride in acetonitrile.

The immiscible liquid phase was first added to a U-shaped glass container such that it occupied the lower volume. The two liquid phases were then added in equal volumetric parts to the arms of the U-shaped glass container. Carbon electrodes were suspended in each phase allowing the current to flow through an external circuit.

Figure 10:
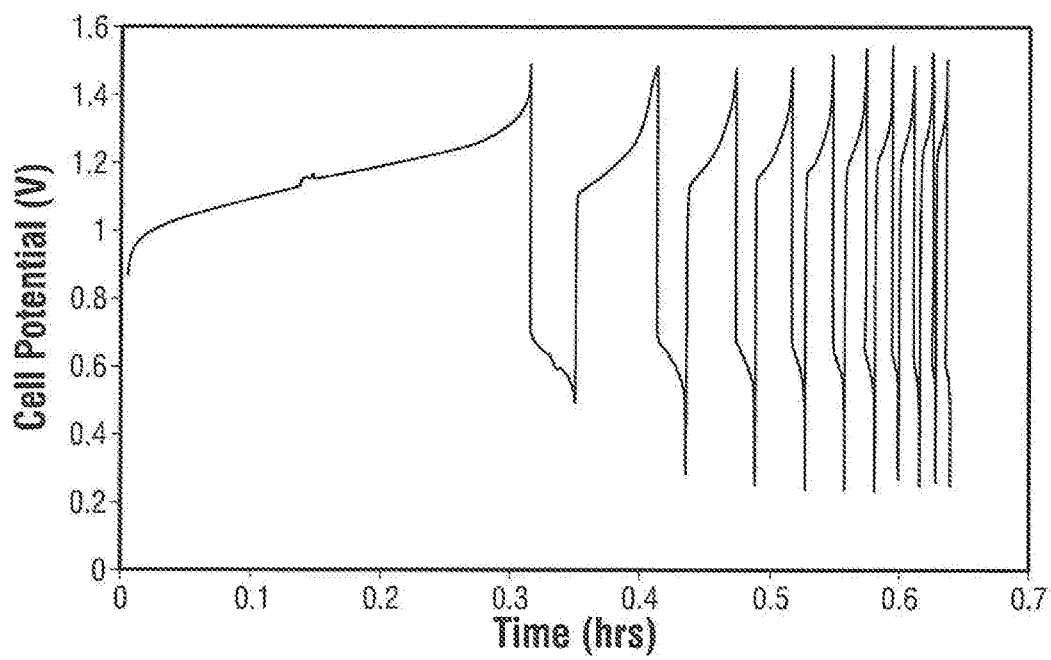
FIG. 10 is a chart illustrating the first 10 cycles for Example 2.
Figure 11:
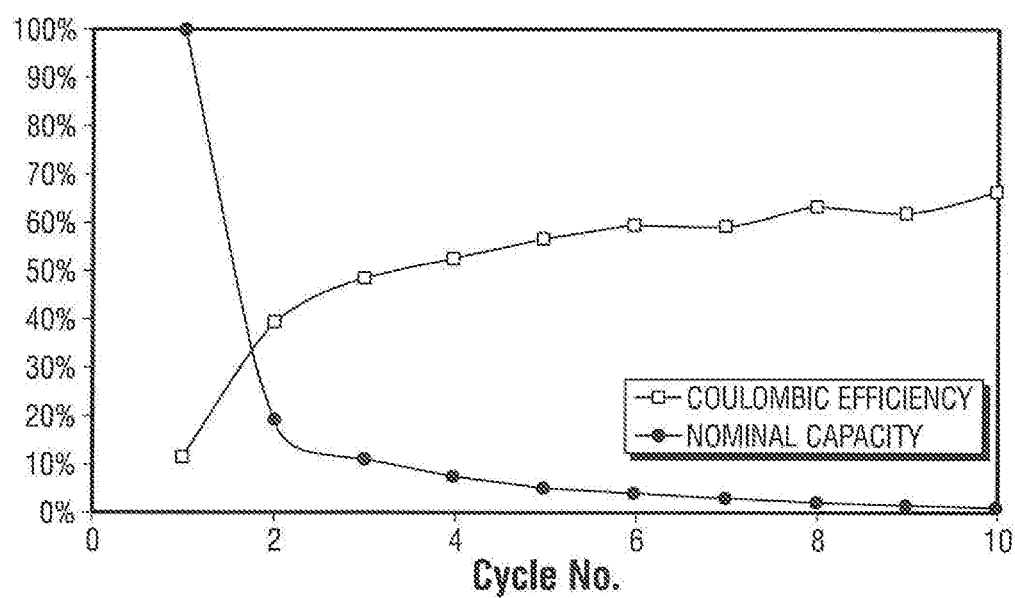
FIG. 11 is a chart illustrating the calculated metrics for Example 2.

Galvanostatic cycles were performed on the assembly, starting with a charge cycle. The cycles were carried out at ±0.5 mA (FIG. 10). The estimated coulombic efficiency of the system was around 47% for the first discharge/charge cycle (see FIG. 11).

Example 3

In Example 3, an energy storage system is demonstrated for a chemical system consisting of two electroactive non-aqueous liquid phases, each containing an electrode. These phases are separated by an aqueous immiscible sodium sulfate brine saturated with acetonitrile. The anolyte phase is a solution consisting of 2.5 mM iron(II) tris(4,4'-di-tert-butyl-2,2'-dipyridyl) hexafluorophosphate and 0.1 M sodium hexafluorophosphate in sodium sulfate brine saturated acetonitrile. The catholyte phase is a solution of 2.5 mM cobalt(III) tris(4,4'-di-tert-butyl-2,2'-dipyridyl) hexafluorophosphate and 0.1 M sodium hexafluorophosphate in sodium sulfate brine saturated acetonitrile.

The immiscible liquid phase was first added to a U-shaped glass container such that it occupied the lower volume. The two liquid phases were then added in equal volumetric parts to the arms of the U-shaped glass container. Carbon electrodes were suspended in each phase allowing the current to flow through an external circuit.

Figure 12:
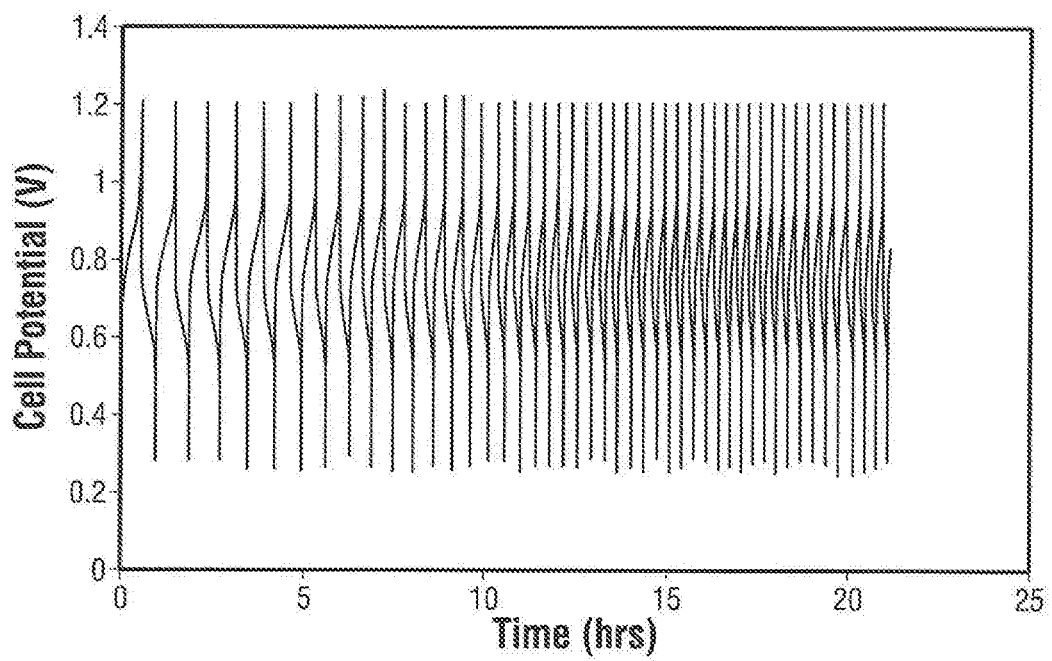
FIG. 12 is a chart illustrating the cycling behavior for Example 3.
Figure 13:
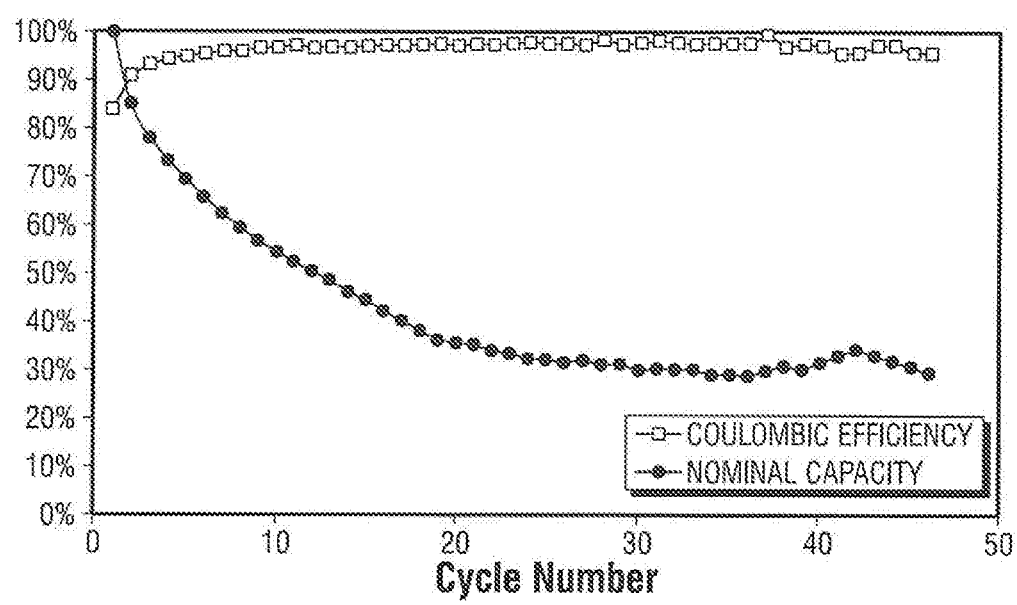
FIG. 13 is a chart illustrating the calculated metrics for Example 3.

Galvanostatic cycles were performed on the assembly, starting with a charge cycle. The cycles were carried out at ±0.5 mA (FIGS. 12). The estimated coulombic efficiency of the system was around 85% for the first discharge/charge cycle (FIG. 13).

Example 4

In Example 4, an energy storage system is demonstrated for a chemical system consisting of two electroactive aqueous liquid phases, each containing an electrode. These phases are separated by a non-aqueous immiscible liquid mixture of dichloromethane/1-butyl-3-methylimidazolium hexafluorophosphate (1:1 weight ratio). The catholyte is a solution consisting of 2.5 mM iron(II) sulfate heptahydrate, 0.1 M sodium hexafluorophosphate, 2 M sulfuric acid in water. The anolyte phase is a solution of 2.5 mM potassium ferricyanide and 0.1 M sodium hexafluorophosphate in water.

The immiscible liquid phase was first added to a U-shaped glass container such that it occupied the lower volume. The two liquid phases were then added in equal volumetric parts to the arms of the U-shaped glass container. Carbon electrodes were suspended in each phase allowing the current to flow through an external circuit.

Figure 14:
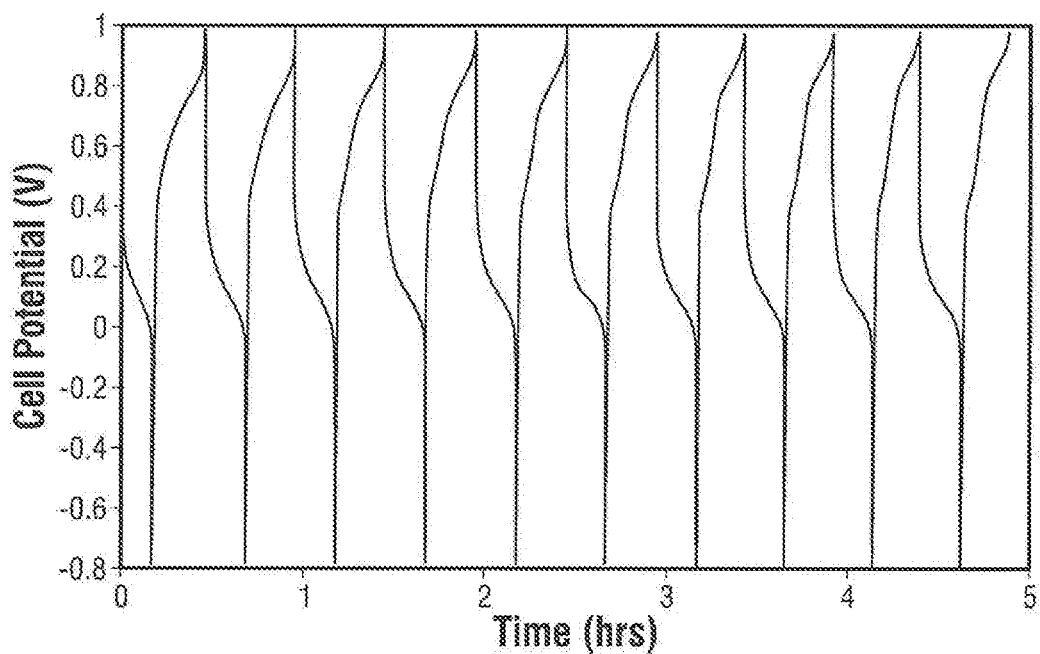
FIG. 14 is a chart illustrating the first ten cycles for Example 4.
Figure 15:
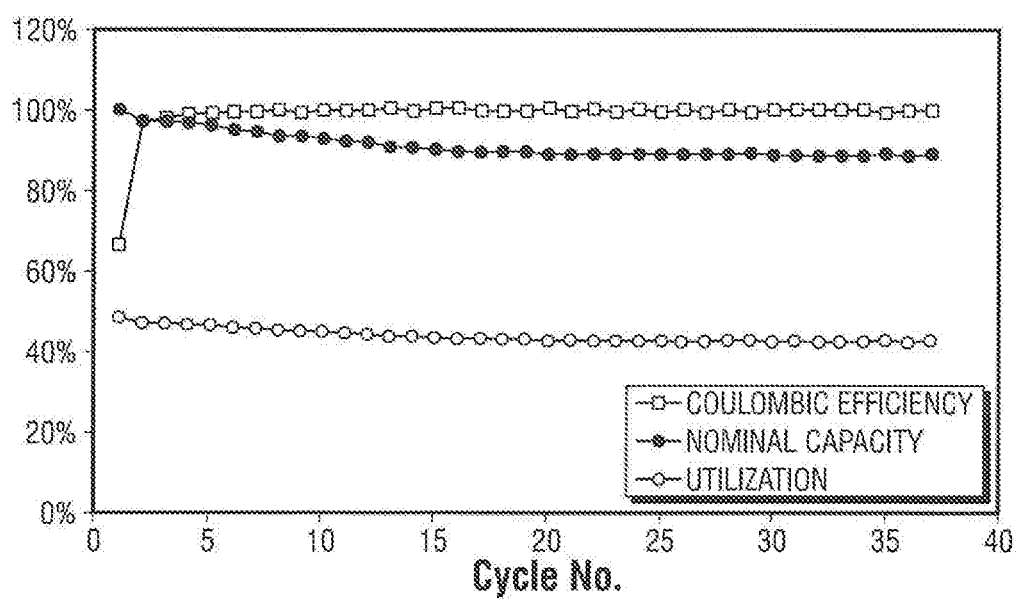
FIG. 15 is a chart showing the calculated metrics for Example 4.

Galvanostatic cycles were performed on the assembly, starting with a charge cycle. The cycles were carried out at ±0.25 mA. The first 10 cycles are shown in FIG. 14. The estimated coulombic efficiency of the system was around 66% for the first discharge/charge cycle (FIG. 15).

Example 5

In Example 5, an energy storage system is demonstrated for a chemical system consisting of two electroactive aqueous liquid phases, each containing an exclusive electrode. These phases are separated by a non-aqueous immiscible ionic liquid comprising 1-butyl-3-methylimidazolium bis(trifluoromethylsulfonyl)imide. The anolyte phase is a solution consisting of 5 mM vanadium(IV) oxide sulfate and 0.2 M lithium bis(trifluoromethylsulfonyl)imide in 2 M sulfuric acid. The catholyte phase is a solution of 10 mM vanadium (IV) oxide sulfate and 0.2 M lithium bis(trifluoromethylsulfonyl)imide in 2 M sulfuric acid.

The immiscible liquid phase was first added to a U-shaped glass container such that it occupied the lower volume. The two liquid phases were then added in equal volumetric parts to the arms of the U-shaped glass container. Carbon electrodes were suspended in each phase allowing the current to flow through an external circuit.

Figure 16:
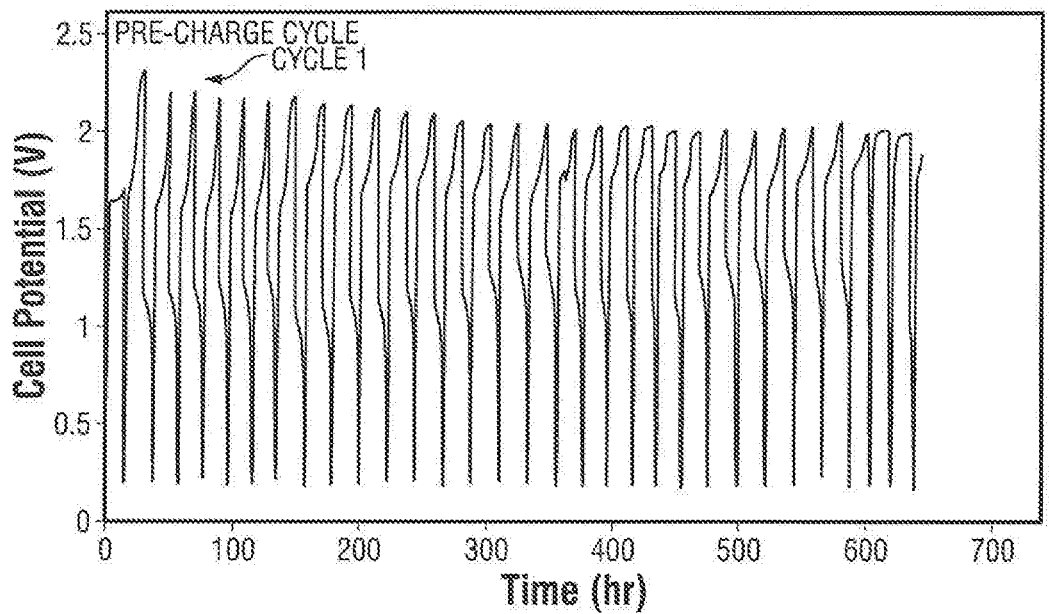
FIG. 16 is a chart illustrating the cycling behavior for Example 5.
Figure 17:
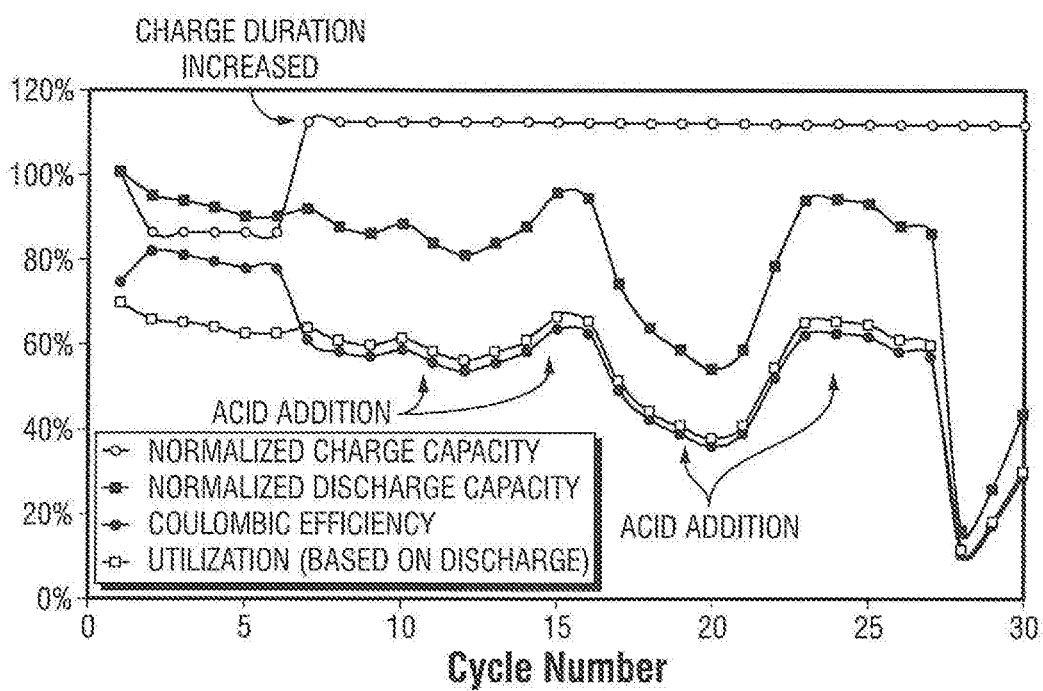
FIG. 17 is a chart illustrating the calculated metrics for Example 5.

Galvanostatic cycles were performed on the assembly, starting with a charge cycle. The cycles were carried out at ±0.25 mA (FIGS. 16). The estimated coulombic efficiency of the system was around 75% for the first discharge/charge cycle (FIG. 17).

Figure 18:
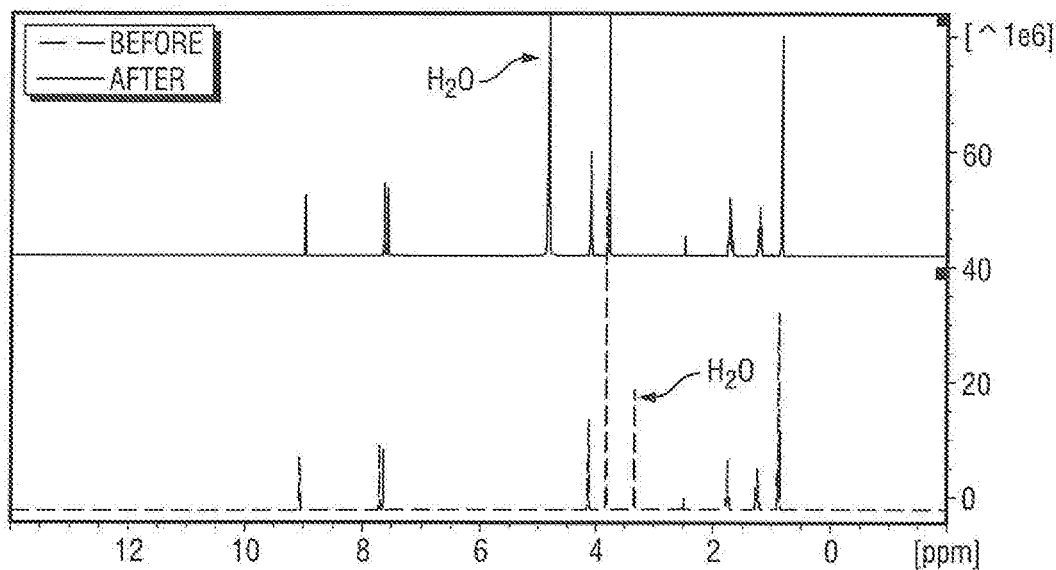
FIG. 18 is the proton NMR analysis of the liquid separator before and after battery cycling showing no degradation.
Figure 19:
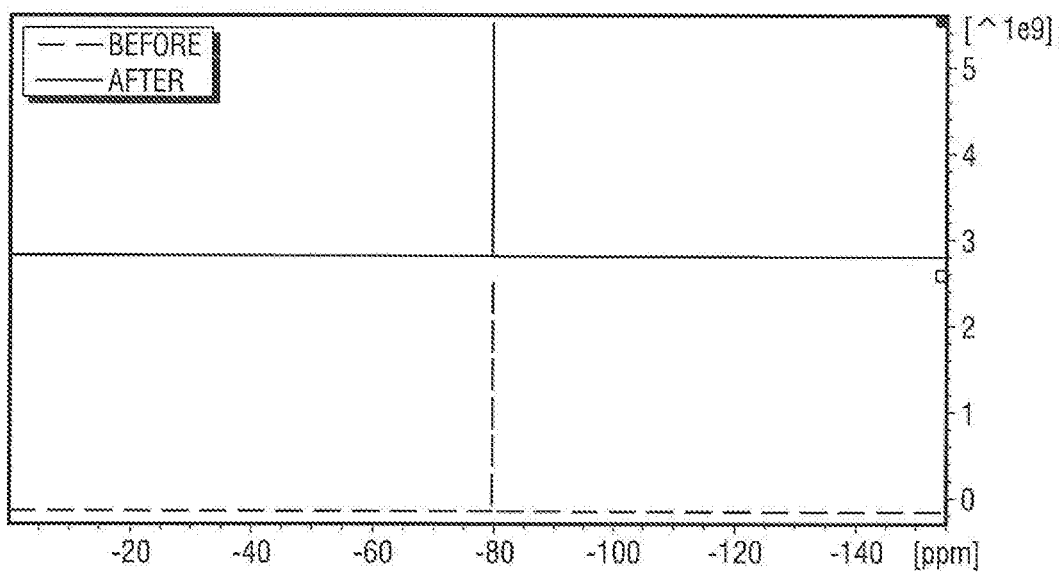
FIG. 19 is the fluorine NMR analysis of the liquid separator before and after battery cycling showing no degradation.

The cell was operated for ~600 hrs or 30 charge/discharge cycles. At the end of cycling, the ionic liquid separator was assessed for degradation by $^1H$ (FIG. 18) and $^{19}F$ (FIG. 19) NMR. No change was detected indicating good stability.

Example 6

In Example 6, a conventional Flow Battery system with a conventional ion-conducting membrane is demonstrated for use in comparison with the above Examples and specifically to Example 5 above. The charge/discharge (C/D) cycling of the vanadium RFB chemistry was completed in standard glass H-cell fitted with a Nafion®-117 membrane. To prepare the membrane, a 1 & ¾" diameter circle of Nafion®-117 perfluorinated membrane (0.007" thick) was cut to size and submerged in 10 mL of 4 N $H_2SO_4$. Nafion® membranes are often referred to as a proton exchange membranes or PEMs. After one day of soaking the membrane, it was removed and used without further pretreatment. For each experiment, the cells were fitted with fresh carbon felt electrodes and stir bars. The catholyte and anolyte solutions were a total volume of 25 mL per half-cell. The catholyte phase is a solution consisting of 10 mM vanadium(IV) oxide sulfate in 2 M sulfuric acid. The catholyte phase is a solution consisting of 5 mM vanadium(IV) oxide sulfate in 2 M sulfuric acid.

Figure 20:
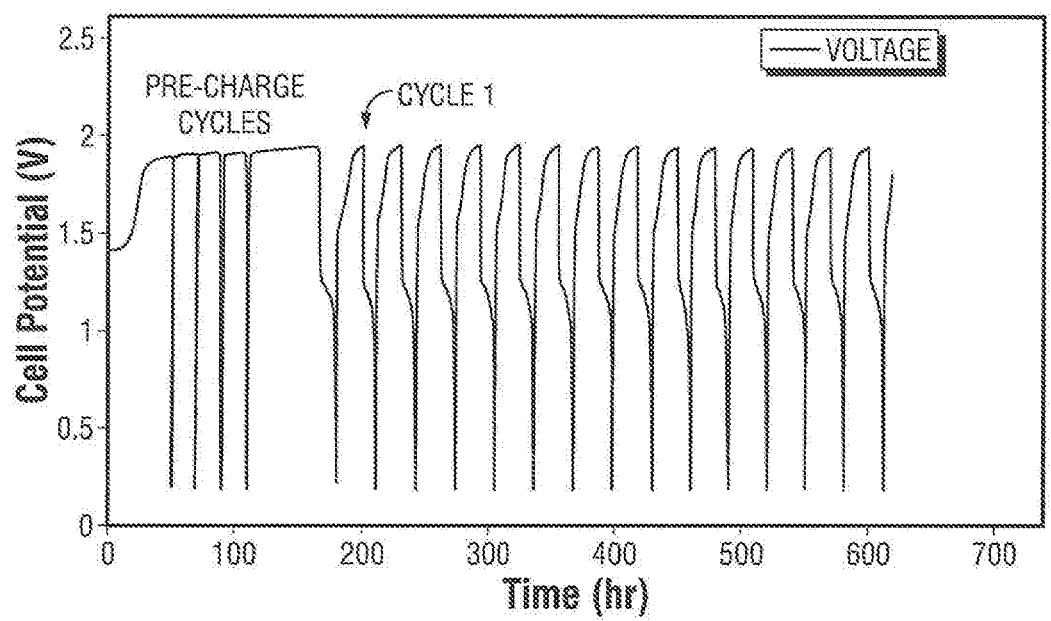
FIG. 20 is a chart illustrating the cycling behavior for Example 6.
Figure 21:
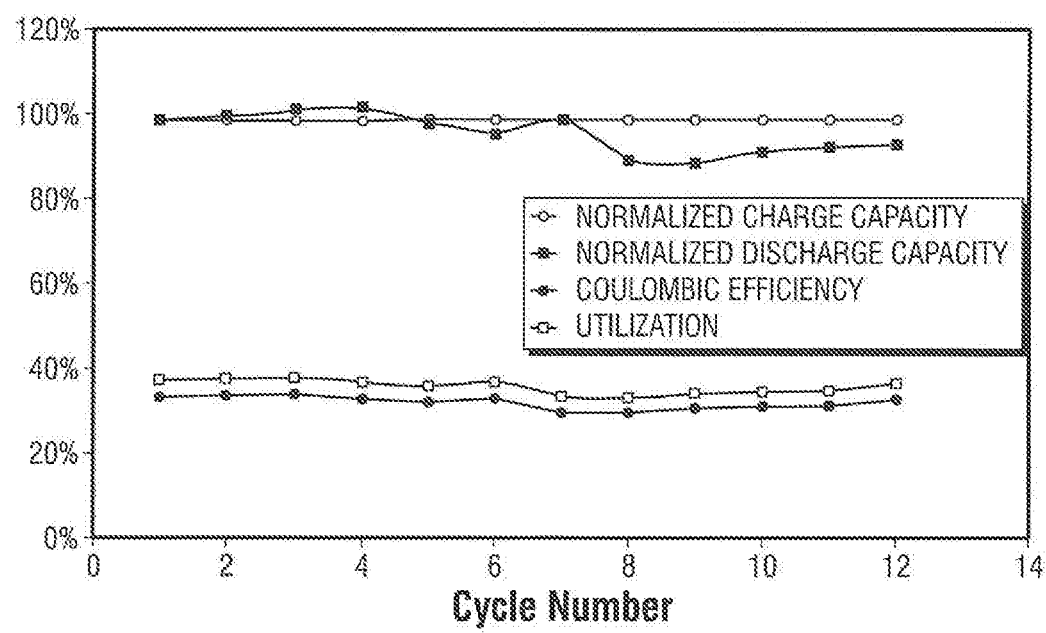
FIG. 21 is a chart illustrating the calculated metrics for Example 6.

Galvanostatic cycles were performed on the assembly, starting with a charge cycle. The cycles were carried out at +1.0 mA and −0.5 mA (FIGS. 20). The estimated coulombic efficiency of the system was around 33% for the first discharge/charge cycle (FIG. 21).

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A redox flow battery comprising:
    a catholyte comprising an electrochemically active material and a supporting electrolyte;
    an anolyte comprising an electrochemically active material and a supporting electrolyte;
    a separator liquid comprising a supporting electrolyte;
    a catholyte storage tank for storing catholyte;
    an anolyte storage tank for storing anolyte;
    a power cell arranged for catholyte, anolyte and separator liquid to immiscibly coexist within the power cell such that the catholyte and anolyte are not in physical contact with one another, but are separated within the power cell by the separator liquid which is in contact with each of the anolyte and catholyte at separate immiscible liquid-liquid interfaces and each of the catholyte and anolyte and separator liquid substantially exist within the power cell each in a continuous phase;
    a catholyte pump to circulate the catholyte from the catholyte storage tank to the power cell and back to the catholyte storage tank; and
    an anolyte pump to circulate anolyte from the anolyte storage tank to the power cell and back to the anolyte storage tank;
    wherein the separator liquid is basically stationary within the power cell while the anolyte and catholyte flow into and out of the power cell and there is no ion-selective resin such as a proton exchange membrane within the redox flow battery separating any of the continuous phases wherein the supporting electrolytes of the anolyte, catholyte and liquid separator all include the same common electrochemical ions and these common ions are able to pass across both liquid-liquid interfaces between the anolyte, catholyte and separator liquid while the electrochemically active materials in the anolyte and catholyte are chemically prevented from crossing the liquid-liquid interfaces.

2. The redox flow battery according to claim 1 wherein the power cell is arranged to be generally U-shaped vessel a lower portion connecting two upwardly extending legs wherein with the separator liquid is positioned within the lower portion of the U-shaped vessel and the anolyte is positioned in one upwardly extending leg and catholyte is position in the other upwardly extending leg such that an immiscible liquid-liquid interface is formed between the separator liquid and each of the anolyte and catholyte and the anolyte and catholyte are not in contact with one another.

3. The redox flow battery according to claim 2 wherein the separator liquid has a density that is greater than the density of either of the anolyte and catholyte.

4. The redox flow battery according to claim 3 further including a buffering device positioned at each of the interfaces of the separator liquid and the respective anolyte and catholyte such that the interface is protected somewhat from being stirred by flows of the anolyte and catholyte into and out of the power cell.

5. The redox flow battery according to claim 4 further including a second buffering device positioned at each of the interfaces of the separator liquid and the respective anolyte and catholyte such that one of the immiscible liquids fill one of the buffering devices and the other immiscible liquid fills the other buffering device and the interface is further protected from being stirred by flows of the anolyte and catholyte into and out of the power cell.

6. The redox flow battery according to claim 5 further including a high surface area graphitic carbon element positioned above the buffering devices at each of the interfaces and a second high surface area graphitic carbon element positioned below the buffering devices at each of the interfaces.

7. The redox flow battery according to claim 1 wherein the power cell includes a vertically oriented buffering device with separator liquid adsorbed therein and the anolyte and catholyte are positioned within the power cell on opposite lateral sides of the vertically oriented buffering device such that the ions that pass through the separator liquid in a generally horizontal path.

8. The redox flow battery according to claim 7 wherein the power cell further includes at least one high surface area graphitic carbon element on each opposite side of the buffering device each in fluid contact with the respective anolyte and catholyte and further including a metallic electrically conductive electrode in electric communication with each high surface area graphitic carbon element on either side of the buffering device through which electric power may pass when the redox flow battery is in operation.

* * * * *